Jan. 5, 1965

J. V. BANKS ETAL 3,164,713

BEAM WELDING APPARATUS

Filed May 14, 1962

INVENTORS
JOHN V. BANKS
ROBERT F. FALGE

BY

James E. Coomey

ATTORNEY

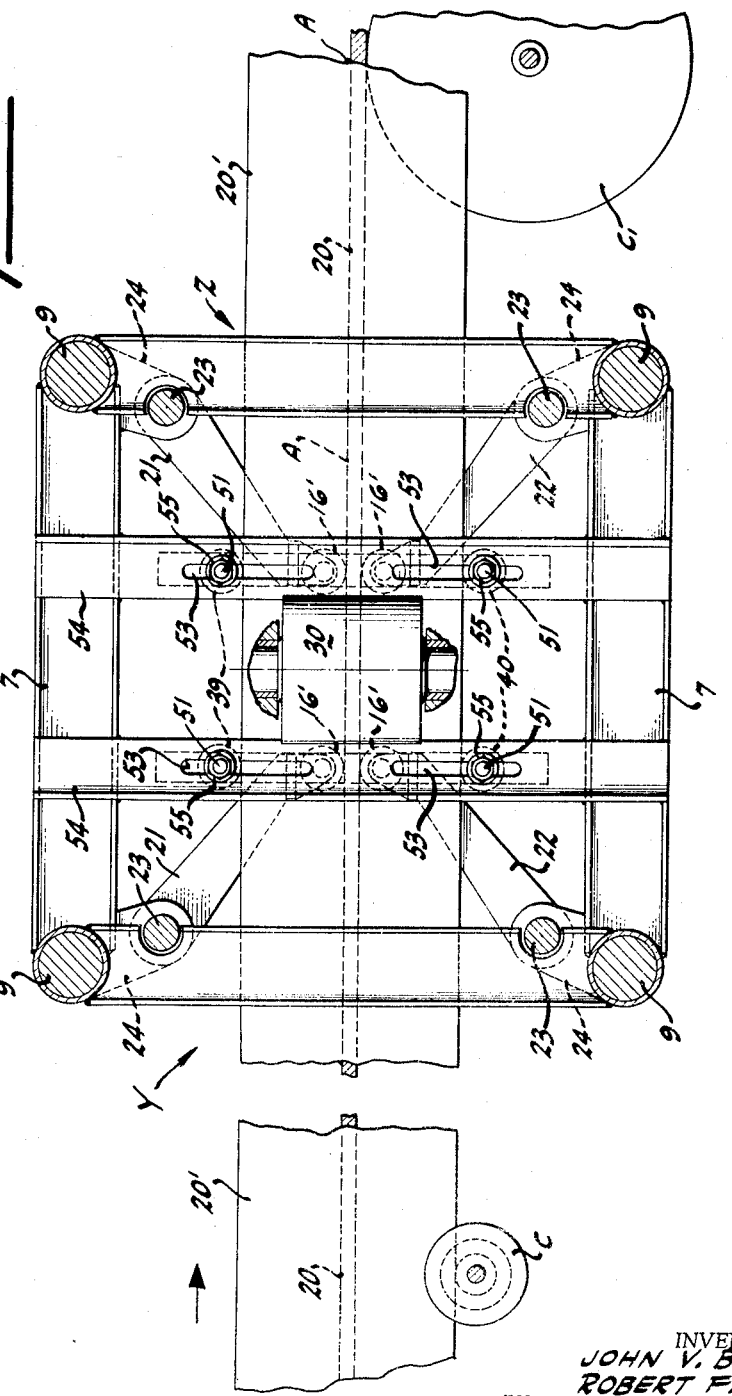

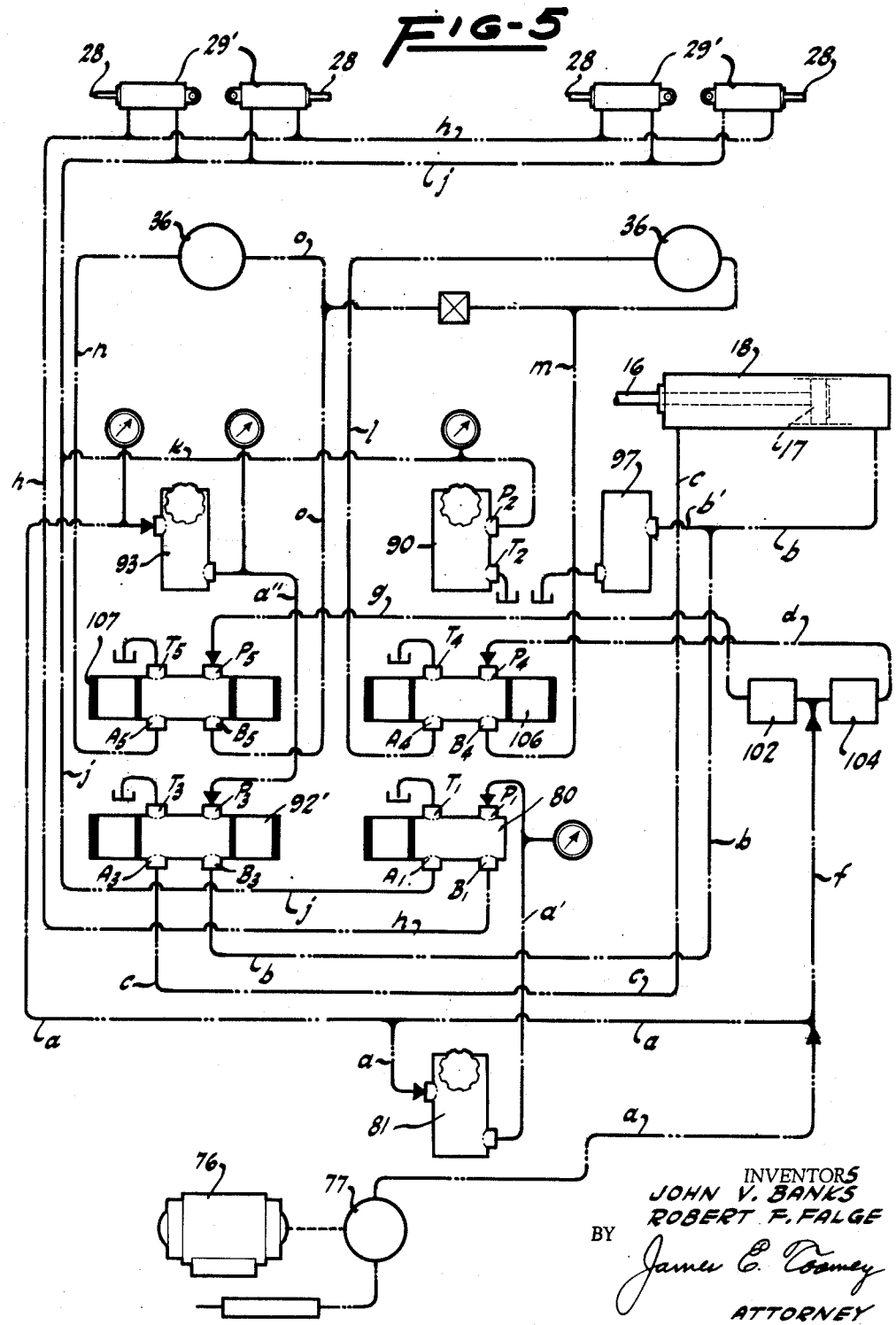

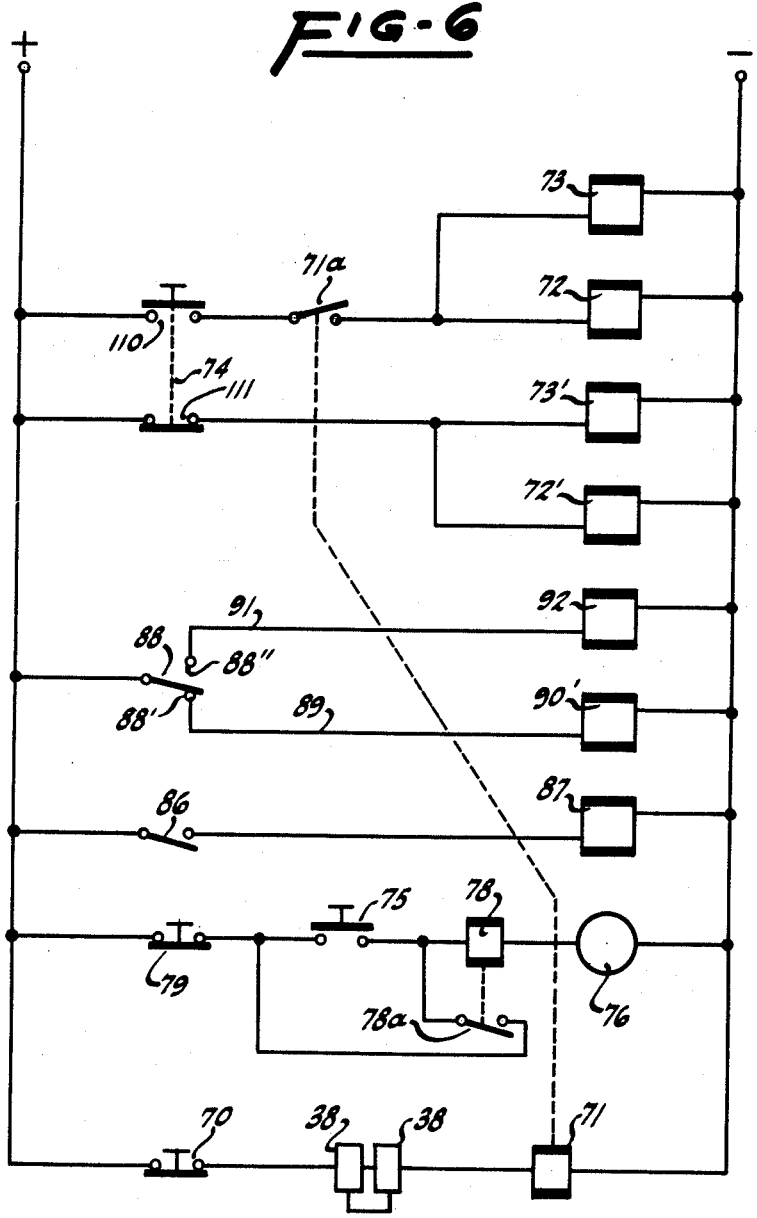

United States Patent Office 3,164,713
Patented Jan. 5, 1965

3,164,713
BEAM WELDING APPARATUS
John V. Banks, San Marino, and Robert F. Falge, Berkeley, Calif., assignors to Kaiser Steel Corporation, Oakland, Calif., a corporation of Nevada
Filed May 14, 1962, Ser. No. 194,610
19 Claims. (Cl. 219—124)

This invention relates to an apparatus for fabricating beams, girders or the like. More particularly, it is concerned with a welding mill apparatus for welding together the various components of a beam, girder or the like wherein a novel arrangement is employed for passing the components of a beam or girder in a clamped condition through a welding mill apparatus and at the same time welding said components together to form a finished beam or girder.

Accordingly, it is the primary purpose of the instant invention to provide a novel welding mill apparatus wherein the various components making up a beam, girder or the like are passed in a unique fashion and in a clamped condition past a suitable welding means in order to fabricate a finished beam or girder.

Other purposes and advantages of the instant invention will become more apparent from a review of the following detailed description when considered in conjunction with the appended drawings, wherein FIG. 1 is a top plan view of the welding mill apparatus of the instant invention along with conveyor elements associated therewith;

FIG. 4 is a sectional view taken generally along line 4—4 of FIG. 1;

FIG. 5 is an over-all schematic view of a suitable hydraulic circuit for use in motivating certain of the elements of the welding mill apparatus shown in FIGS. 1–4; and FIG. 6 is an over-all schematic view of a suitable electrical system for use in energizing certain of the components of the hydraulic circuit, etc., shown in FIG. 5.

Figure 1:
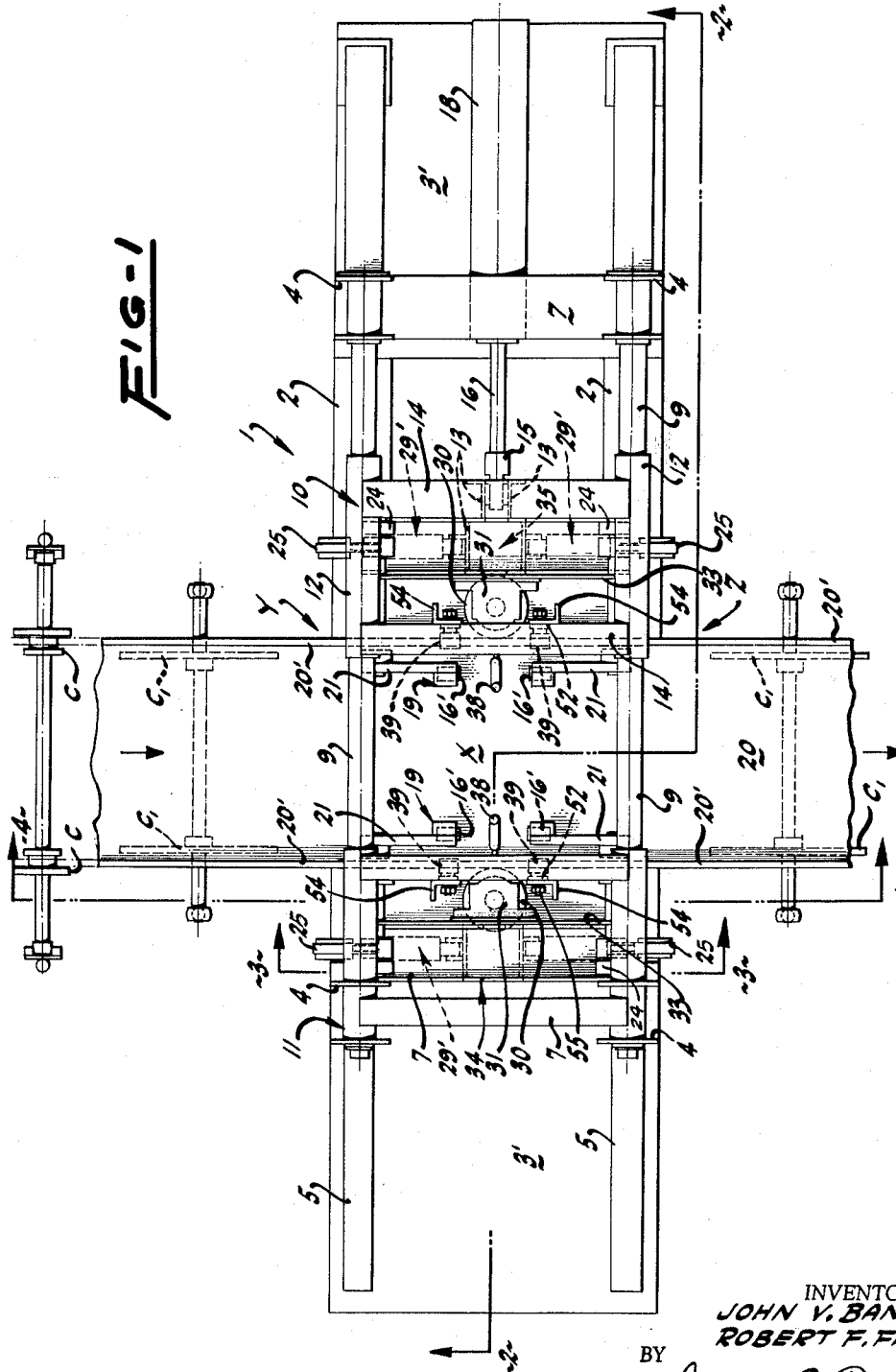

With further reference to the drawings and in particular FIG. 1, the welding mill apparatus of the instant invention is generally comprised of an over-all framework 1. This framework includes a plurality of elongated base frame I beam elements 2 mounted on the floor of the building housing the welding mill apparatus. Base frame members 2 are affixed to each other by the bridging or cross members 3. A pair of base plates 3' are mounted upon the base frame members 2 and cross members 3 at opposing sides of the framework 1. A plurality of upright columns or stanchion members 4 is disposed upon each of the plates 3' and anchored thereto by means of the angularly disposed reinforcing frame elements 5. Conventional bridging elements 7 are disposed between and secured to the several stanchion members 4 for the purpose of rigidifying the same.

Mounted between the opposing pairs of stanchion members 4 and bridging the opening or passageway X therebetween is a plurality of rods or tubular members 9. There rods serve two functions. In the first place, they act to tie the various stanchion members 4 together, thereby rigidifying them on the framework 1. They also act as ways or slides for the movable carriage 10 located at the right-hand side of the apparatus, as viewed in FIGS. 1 and 2 of the drawings. Carriage 10 and its operation will be described more fully hereinafter. In general, the apparatus might be said to comprise a fixed framework portion 11 and allied elements located at the left-hand side of the apparatus, as viewed in FIGS. 1 and 2 of the drawings, and a movable carriage 10 and allied elements located at the right-hand side of the apparatus, as viewed in FIGS. 1 and 2 of the drawings, for slidably and clampingly supporting the components of a girder or beam during the time they are passed through the passageway X of the welding mill and welded together.

The various allied elements on the fixed framework portion 11 and carriage 10 for slidably and clampingly supporting the various beam components during their passage through the welding mill appartus will now be described. Since similar sets of allied elements are used on both the framework portion 11 and carriage 10, a description of one set of allied elements will suffice for both sets. Further, although the instant apparatus will be described with particular reference to its use in welding together the several components of a wide flanged I beam, it is to be understood that the apparatus can be used for fabricating other types of beams and girders.

Before describing one set of allied elements, it is to be observed that suitable means are provided for mounting and adjusting the carriage 10 with respect to fixed framework portion 11. These means include the rods 9 noted above and a plurality of sleeve elements 12 on the carriage 10 which slidably fit over the rods or tubes 9. These sleeve elements are interconnected with each other by means of a series of vertically and horizontally disposed frame elements 13 and 14 so as to form the box-like carriage 10. Rigidly affixed to certain of the vertically disposed frame elements 13 is a yoke 15. The rod end of a piston rod 16 is threadedly affixed to this yoke 15 and the piston 17 on rod 16 is disposed in the cylinder 18 with cylinder 18, in turn, being rigidly affixed to the stanchions 4 and bridging elements 7 located at the right-hand side of the apparatus, as viewed in FIGS. 1 and 2 of the drawings.

As further indicated in the drawings, each set of the allied elements noted above comprises a plurality of pairs of beam web clamping rollers 16' which engage the opposite sides of the horizontally disposed web 20 of the I beam being fabricated. Rollers 16' are arranged in oppositely disposed upper and lower pairs of roller assemblies 19 and 19'. The bottom set or pair 19' of rollers 16' is adapted to bear against and support the under surface of the web 20 of an I beam, while the top set 19 of rollers 16' is adapted to bear against the top surface of web 20. The top set 19 of rollers 16' is mounted in bifurcated arms 21, while the lower set 19' of rollers 16' is mounted in the bifurcated arms 22. Each of the arms 21 and 22 is secured to a separate pivot pin 23 which is suspended or mounted on the carriage 10 or fixed portion 11 of the framework, as the case may be, by the pin holders 24.

Also rigidly affixed to pivot pin 23 is one extremity of a linkage 25. The opposing end of each linkage 25 is pivotally affixed to a pair of lever arms 26. Each pair of lever arms 26 for one upper and one lower roller 16' is attached to a yoke element 27 which is mounted upon and forms an extension of a piston rod 28 for the piston 28' mounted in the horizontally disposed cylinder 29, all of which make up a piston and cylinder assembly 29'. Two such assemblies 29' are employed on both the fixed portion 11 of the framework and the carriage 10. One piston and cylinder assembly 29' on the carriage 10 and one on the fixed portion 11 of the framework actuate the two pairs of upper and lower cooperating rollers 16' at the entry side Y of the mill and the other two piston and cylinder assemblies 29' actuate the two pairs of cooperating upper and lower rollers 16' at the exit side Z of the mill. From the above description, it will be observed that upon simultaneous energization and outward movement of all piston rods 28 in all of the assemblies 29' that each mating upper and lower roller 16' will be moved towards one another and that upon simultaneous energization and inward movement of all piston rods 28 in all of the assemblies 29' that each mating upper and lower roller 16' will be moved or drawn away from one another so as to alternately slidingly clamp themselves about or unclamp themselves from the opposite sides of the web 20 of the I beam being fabricated.

Figure 2:
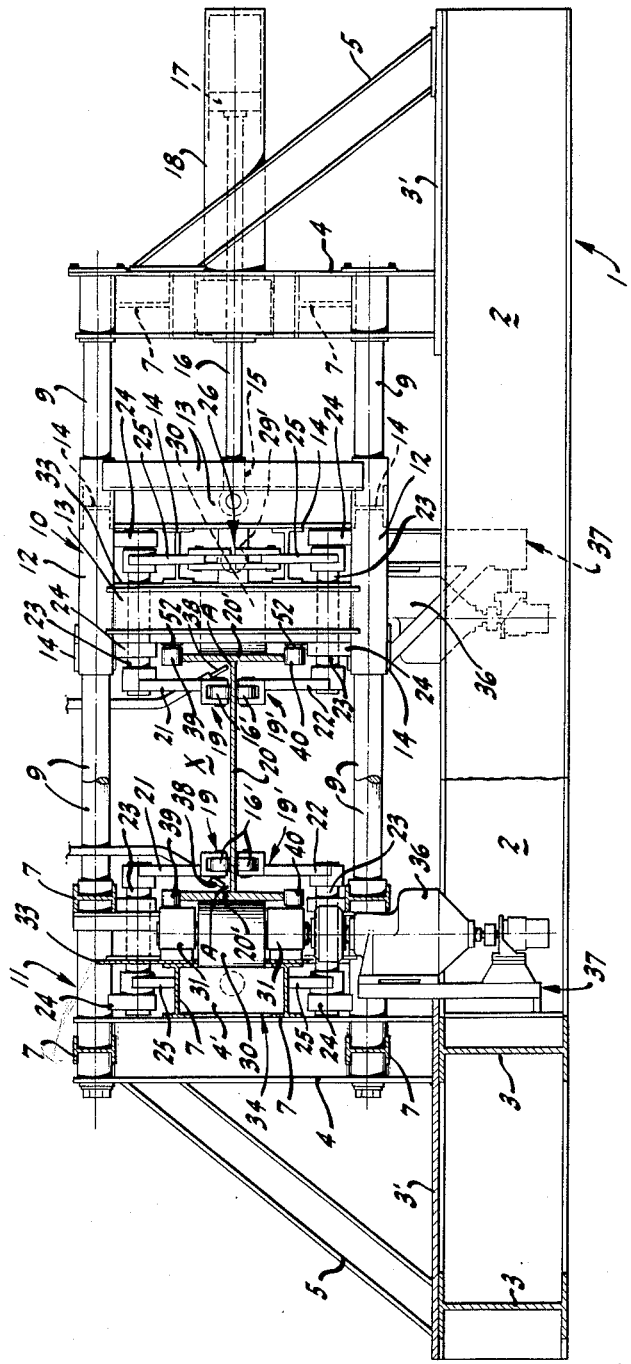
FIG. 2 is a sectional view of the welding mill apparatus of the instant invention when taken generally along line 2—2 of FIG. 1.
Figure 3:
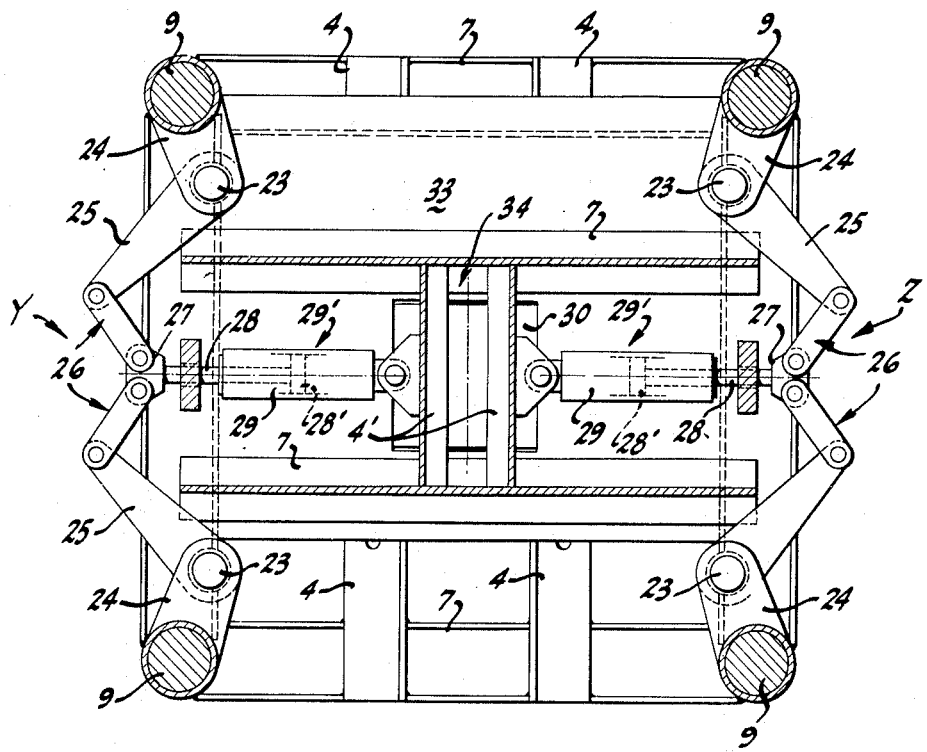
FIG. 3 is a sectional view taken generally along line 3—3 of FIG. 1.

It will be further observed, reference being made particularly to FIGS. 1 and 2 of the drawings, that a separate pressure-exerting back-up roll 30 is mounted on the fixed portion 11 of the framework, as well as on the carriage 10. Each roll 30 is mounted in opposing relationship to the other roll 30 by means of suitable journal-bearing elements 31. In the case of fixed portion 11 of the framework, the journal-bearing members 31 are anchored to a suitable back-up plate 33 disposed between rods 9. Plate 33 is tied to the several interiorly disposed frame elements 7 and short stanchions 4' which form an inner box frame 34 to which piston and cylinder assemblies 29' for the fixed portion 11 of the framework 11 are anchored. In the case of carriage 10, the journal-bearing members 31 are likewise affixed to a plate 33 disposed between the sleeves 12 on rods 9. This latter plate 33 in the case of carriage 10 is tied to several interiorly disposed beams 14 and 13 which form an inner box frame 35 to which piston and cylinder assemblies 29' for the carriage 10 are anchored.

It is to be further understood that both of plates 33 are provided with suitable recesses or openings through which all of the pivot pins 23 and other elements project. Each of the rolls 30 is independently driven by suitable motor means, such as by means of a fluid motor 36 anchored to the carriage 10 and the fixed portion 11 of the framework by conventional bracket assemblies 37. Back-up rolls 30 engage the outside surfaces of the flanges 20' for the I beam being fabricated adjacent the point where the web 20 and flanges 20' meet and serve the dual function of first clamping the web 20 and flanges 20' together and, secondly, driving the aforesaid clamped beam components through the mill and past the welding heads 38 so that the web 20 and flanges 20' can be welded together.

A further advantageous embodiment of the invention contemplates that a means be provided for slidably and clampingly supporting the flanges 20' as they pass through the mill in order to insure proper alignment at all times between the flanges 20' and the web 20 of the beam or girder. These means comprise in the case of the carriage 10 and fixed framework portion 11 a pair of spaced upper flange-engaging rollers 39 and a pair of spaced lower flange engaging rollers 40. The pairs of upper and lower flange engaging rollers 39 and 40 on carriage 10 and fixed framework portion 11 project into the adjustable opening or passageway X between carriage 10 and fixed framework portion 11 along with web-engaging rollers 16' and serve as a box-like guide for each of the flanges 20'.

Flange-engaging rollers 39 and 40 can be adjustably mounted in a fashion similar to web-engaging rollers 16' or, as indicated particularly in FIG. 4, they can be adjustably mounted, as indicated in the drawings, by arranging the threaded stud bolts 51 of the bearings 52 for each of the rollers 39 and 40 in slots 53 in the channel members 54 affixed to certain of the bridging elements 7 in the case of fixed framework portion 11 and certain of the frame elements 14 in the case of carriage 10. After each roller 39 and 40 has been located at the position desired, it is secured in this position by tightening up the lock nut 55 for the stud bolt 51 associated with the particular roller.

From the above description, it will be appreciated that the flange-engaging rollers 39 and 40 and web-engaging rollers 16' provide continuous support for the web 20 and flanges 20' of the beam being fabricated as close as possible to the continuous weld line A of the beam being fabricated. The longitudinal spacing of rollers 39 and 40 with respect to each other and rollers 16' with respect to each other is such as to insure web and flange contact for a sufficient distance to permit solidification of molten weld metal at the weld line A. In this connection, it is to be noted that each of the welding head units 38 can be conventional submerged arc welding units. Welding head units which have been found acceptable are those manufactured and sold by the Lincoln Electric Company of Cleveland, Ohio, namely, models LAF3 D.C. and LAF4 A.C., both of which can be suitably connected in tandem.

By virtue of using the piston 17 in cylinder 18 to adjust and hold carriage 10 and, in turn, the roll 30 on carriage 10 in a clamping condition against one of the flanges of the I beam, the back-up roll 30 on the carriage can be said to be always floatingly mounted with respect to the roll 30 on the fixed portion 11 of the framework, as well as the work. This is a particularly advantageous arrangement in the case of where the I beam being manufactured has a web 20 that is tapered along its longitudinal axis. Due to this manner of mounting and moving the flange pressure roll 30 on the carriage 10 with respect to roll 30 on portion 11 of the framework, rolls 30 can thus readily accommodate beams having such a tapered web while still maintaining a constant and uniform pressure urging the flange sections 20' against the web section 20 along the entire length of the beam and thereby insuring a sound weld for the length of the beam.

The means for operating and synchronizing the movements of the various web and flange clamping rollers 16', 39 and 40 and the back-up and driving rolls 30 will now be described.

With further reference to the drawings and in particular FIGS. 5 and 6, after the several components, such as flange section 20' and a web section 20, have been moved into position adjacent the entry end Y of the mill by suitable adjustable conveyor rolls C for the flange sections 20' and conveyor rolls $C_1$ for the web section 20, whereby the flange sections 20' and web 20 will be properly lined up with rollers 16', 39 and 40, the welding head units 38 can be placed in an energizable condition by closing the switch 70. Welding head units 38 are disposed above welding line A or at the point of intersection of flange sections 20' and web section 20 of the beam being fabricated. Closing of switch 70 also effects energization of relay 71. Energization of relay 71 produces a closing of the normally open switch 71a in the circuit leading to solenoids 72 and 73, whereby the circuit to solenoids 72 and 73 can be energized upon the closing of the contacts 110 of double-acting switch element 74.

The specific circuit for the welding head units is not shown since it does not form any part of the instant invention. It is to be noted, however, that main switch 70 merely puts the welding head units in an energizable condition and that a separate switch or switches are used for actually energizing these welding heads. After or before switch 70 is closed, motor starting switch 75 is also momentarily depressed. The momentary depression of switch 75 closes the circuit to the motor 76 that motivates the fluid circuit pump 77. It will be noted by reference to FIG. 6 that the motor circuit includes a relay 78 which controls the switch 78a. When relay 78 is energized, switch 78a becomes closed and allows current to bypass switch 75, thereby continuing the energization of motor 76 when switch 75 is released. The over-all master switch 79 in the motor circuit is maintained normally in a closed condition, except when it is desirable to completely open the circuit to motor 76.

After the welding head units 38 are placed in a ready condition and motor 76 has been started, the web clamp piston and cylinder assemblies 29' are actuated by means of the solenoid operated valve 80 in the following manner. Full system pressure is first piped to a suitable pressure-reducing valve 81 through the medium of line $a$ from the pump 77. Fluid passes from valve 81 through line $a'$ to the intake port $P_1$ of the valve 80. The switch 86 shown in the electrical circuit of FIG. 6 in the meantime is depressed to a closed position. When switch 86 is depressed to a closed position, this energizes the solenoid 87 controlling valve 80 and causes movement of the spool in valve 80, such that port $B_1$ is connected with port $T_1$ leading to the tank or reservoir and port $P_1$ is connected to port $A_1$. As the pressure port $P_1$ is opened to pressure port $A_1$ of the valve 80 and port $B_1$ to port $T_1$, fluid is passed out of port $A_1$ and through line $j$ simultaneously to all of the piston ends of the cylinders 29 of the web-clamping piston and cylinder assemblies 29', there being two such assemblies both on the carriage 10 and the fixed portion 11 of the framework. Upon introduction of the fluid into the piston end of the several cylinders 29, the pistons 28' will move rods 28 outwardly of the cylinders and, in turn, effect a movement of the web-clamping rollers 16' of the roller assemblies 19 and 19' on the carriage 10 and the fixed portion 11 of the framework toward each other and into a web section clamping position. To prevent overloading of the various components of the web-clamping cylinders and roller assemblies, a pressure relief valve 90 is advantageously connected to the pressure line $j$ through the medium of the line $k$ which leads to the port $P_2$ of the pressure relief valve, the exhaust port $T_2$ of this valve being connected to the tank. When it is desirable to release the clamping pressure on the web-clamping roller assemblies 18 and 19, the switch 86 is opened. This causes de-energization of solenoid 87 and movement of the spool in the solenoid operated valve 80 in the opposite direction to that produced when switch 86 was depressed. At this time, pressure port $P_1$ is opened to port $B_1$ and port $A_1$ is opened to port $T_1$ leading to the tank. When valve 80 is motivated in this manner, fluid will then be injected simultaneously into the rod ends of the several cylinders 29 through the line $h$ with fluid then evacuated from the opposite side of the cylinders 29 through line $j$ and into port $A_1$ of valve 80 to port $T_1$ of valve 80 and then back to the tank.

With the roller assemblies 19 and 19' in a web-clamping condition and with rollers 39 and 40 having been previously adjusted to accommodate the flange sections of the beam to be welded, the carriage 10 is next moved to its proper pressure-exerting and clamping position by energizing the piston 17 in cylinder 18.

In order to effect the movement of the piston 17 within cylinder 18 and toward the left, as viewed in FIG. 5 of the drawings, for the purpose of urging carriage 10 towards the fixed portion 11 of the framework, the three-position switch 88 is moved to the closed position disclosed in FIG. 6. When it is moved in this position, contacts 88' are closed thereby closing the circuit through line 89 leading to the solenoid 90' and energizing this solenoid while opening the circuit through line 91 leading to solenoid 92.

Energization of solenoid 90' and de-energization of solenoid 92 causes a movement of the spool in the valve 92' shown in FIG. 5, such that the port $A_3$ of valve 92' is connected to port $T_3$ and port $B_3$ is connected to port $P_3$. This allows fluid passing from line $a$ and through the pressure control valve 93 to be passed through line $a'$ into port $P_3$ of valve 92' and out through the port $B_3$ into line $b$. Fluid from line $b$ then passes into the piston end of the cylinder 18 moving the piston 17 towards the left, as shown in the drawings, along with the carriage 10 and the other elements associated therewith. In the meantime, fluid is evacuated from the rod end of the cylinder 18 through line $c$ into the port $A_3$ of valve 92' and then out through port $T_3$ into the tank. Also connected to line $b$ by means of line $b'$ is a pressure relief valve 97. The purpose of this latter valve is to relieve build-up pressure that results from variation in the depths of the beams being fabricated on the mill. This valve 97 is particularly used to advantage in the case of where tapered beams are run through the mill and where the piston 17 may have to be progressively moved backwards or forwards, depending, of course, upon the manner in which the taper runs in the beam. In any event, the use of this relief valve and the manner in which it is disposed in the fluid system insures that constant uniform pressure will always be exerted upon the back-up roller 30 on the carriage 10 and that a good weld will be obtained for the length of the beam being welded. When it is desirable to retract the carriage 10, the switch 88 is moved to its opposing position at which time contacts 88' are opened and contacts 88" closed. Closing of contacts 88" and opening of contacts 88' effects a de-energization of solenoid 90' and energization of solenoid 92. De-energization of solenoid 90' and energization of solenoid 92 by virtue of contacts 88" having been closed causes the spool in the valve 92' to shift, thereby connecting port $P_3$ with port $A_3$ and port $B_3$ with port $T_3$. The fluid then entering valve 92' through port $P_3$ is transmitted through line $c$ into the rod end of the cylinder 18 causing the piston 17 to recede within the cylinder 18 and fluid to be ejected from the piston end of the cylinder 18 through line $b$ and ports $B_3$ and $T_3$ and back to the tank.

The various back-up rolls 30 are driven in the following fashion so as to drive the various clamped components 20 and 20' of a beam through the machine and past the welding heads 38 at the speed selected for welding. Each motor 36 for a drive roller 30 is ultimately connected to one of the flow control valves 102 and 104. Valves 102 and 104 are connected to pump 77 by line $f$. Line $d$ connects flow control valve 104 to the solenoid control valve 106 which directly controls the fluid motor 36 for operating one of the rolls 30 and the line $g$ connects flow control valve 102 to the solenoid control valve 107 for directly controlling the other fluid motor 36 that operates the other back-up roll 30.

The solenoids 72 and 72' for controlling valve 106 and the solenoids 73 and 73' for controlling the valve 107 are energized by means of the double-acting control switch element 74. When the switch element 74 is pushed down, it closes the contacts 110 thereby energizing the solenoids 72 and 73, switch 71a having been previously closed upon the closure of switch 70. Energization of solenoids 72 and 73 causes the port $P_4$ to be connected with port $A_4$ and port $B_4$ with port $T_4$ in valve 106 and the port $P_5$ to be connected with port $A_5$ and port $B_5$ to be connected with port $T_5$ in valve 107. This disposition of valves 106 and 107 allows fluid from line $d$ to be transmitted through valve 106 and out through port $A_4$ and line $l$ into the forward side of one of the fluid motors 36, such as the motor for the roll on the carriage 10, and then back through line $m$ into port $B_4$ and then through valve 106 to the tank. At the same time, fluid is simultaneously being pumped through line $g$ into port $P_5$ of valve 107 and out through port $A_5$ thereof through line $n$ into the forward side of the fluid motor 36 driving roll 30 on portion 11 of the framework and then back from the motor through line $o$ into port $B_5$ and out through port $T_5$ of valve 107 to the tank. Movement of the motors 36 in this fashion drives the main pressure rolls 30 in the forward direction. When it is desirable to reverse the rotational direction of rolls 30, the switch 74 is raised such that the contacts 110 are opened and the contacts 111 are closed. When the contacts 111 are closed and the contacts 110 are opened, solenoids 72 and 73 are deenergized and solenoids 72' and 73' are energized thereby reversing the spools in the respective valves 106 and 107 and connecting port $P_4$ to port $B_4$ and port $T_4$ to port $A_4$ in the case of valve 106 and port $P_5$ to port $B_5$ and port $T_5$ to port $A_5$ in the case of valve 107. Fluid will then be passed through the reverse side of the hydraulic motors 36 and cause the rolls 30 to be driven in a reverse direction.

By referring to FIG. 6 of the drawings, it will be observed that the incorporation of switch 71a in the circuit for solenoids 72 and 73 results in a built-in safety feature in that if, for any reason, the welding is to be stopped by releasing master switch 70, switch 71a will also open and break the circuit to these solenoids without at the same time closing solenoids 72′ and 73′. The spool in valves 106 and 107 will then be placed in a neutral position and motors 36 and rolls 30 will stop.

Although the above-described safety feature has been incorporated only in the circuit for solenoids 72 and 73 since it is contemplated that the welding could occur only during the forward movement of a beam through the mill, a similar safety feature could be incorporated in the circuits for solenoids 72′ and 73′ if, for any reason, it is desirable to weld a beam during a reverse passage through the mill.

An advantageous embodiment of the invention has been disclosed and described. It is obvious that various changes and modifications may be made therein without departing from the scope thereof, as defined in the appended claims, wherein—

What is claimed is:

1. Apparatus for welding beams comprising the combination of a framework, a first support means mounted on said framework for slidably supporting a first beam component, a second support means on said framework for slidably supporting a second beam component at a predetermined angle with respect to said first beam component, a welding head means affixed to said framework and disposed adjacent the point where said components contact each other while being supported on said support means, back-up roll means including a floatingly mounted back up roll mounted on said framework for engaging one of said components and for pressing said one of said beam components into clamping contact with the other of said beam components, means driving said roll means including said floatingly mounted back up roll and in turn said beam components in clamped condition past said welding head means, and means for holding said floatingly mounted back-up roll in constant pressure contact with said one of said components at all times during the driving of said floatingly mounted back up roll and while said components are driven in a clamped condition past said welding head means by said back-up roll means.

2. Apparatus as set forth in claim 1 wherein said first support means includes opposed pairs of rollers movable into and out of engagement with opposed sides of the first beam component, the rollers in each pair of rollers also being spaced with respect to each other and lever and link means for moving said opposed pairs of rollers into and out of engagement with the opposed sides of said first beam component.

3. Apparatus as set forth in claim 1 wherein said second support means includes opposed pairs of spaced rollers for engaging the opposed edges of the second beam component, the rollers in each pair also being spaced with respect to each other.

4. Apparatus as set forth in claim 2 wherein the welding head means is located intermediate the rollers in a pair of rollers of said first support means.

5. Apparatus as set forth in claim 3 wherein the welding head means is located intermediate the rollers in a pair of rollers of said second support means.

6. Apparatus for welding beams comprising the combination of a framework, a carriage slidably mounted on said framework, a plurality of rollers mounted on a fixed portion of said framework, a second plurality of rollers mounted on said carriage, means for moving said first and and second plurality of rollers into supporting and sliding engagement with opposed sides of a first beam component, separately mounted support means on said carriage and the fixed portion of the framework for slidably supporting other beam components at a redetermined angle and in a fixed position with respect to said first beam component, a welding head means mounted on said framework and disposed adjacent the point where said components contact each other while being supported in a fixed position with respect to each other, a back-up roll mounted on the fixed portion of the framework and a back-up roll mounted on the carriage, said back-up rolls being adapted to engage said other beam components and to press said other components into clamping contact and engagement with the first said beam component, means driving said back-up rolls and in turn said beam components past said welding head means and means for selectively moving said carriage and the back-up roll mounted thereon into holding engagement with one of said components so as to maintain all of said components in a fully clamped condition as the clamped components are driven past said welding head means by said back-up rolls.

7. Apparatus as set forth in claim 6 wherein the welding head means is located intermediate certain of the rollers in one plurality of rollers.

8. Apparatus as set forth in claim 6 wherein the means for moving said first and second plurality of rollers into and out of supporting and sliding engagement with said first beam component includes arms upon which said rollers are mounted and electro-mechanical means for simultaneously operating all of said arms.

9. Apparatus as set forth in claim 6 including electro-mechanical means for automatically discontinuing the driving of said back-up rolls and the movement of said clamped components past said welding head means upon the de-energization of said welding head means.

10. Apparatus as set forth in claim 6 wherein the means for selectively moving said carriage and the back-up roll mounted thereon into holding engagement with one of said components so as to maintain all of said components in a clamped condition as the components are driven past the welding head means includes a piston and cylinder assembly, fluid circuit means for motivating the piston within the cylinder of the piston and cylinder assembly, and a pressure relief valve means in said fluid circuit means for relieving the pressure in the fluid circuit means so as to maintain a constant predetermined pressure on the said piston, the back-up roll mounted on the carriage and said one beam component irrespective of the width of the first component.

11. A device for fabricating beams and the like comprising the combination of a framework and a carriage slidably mounted upon said framework, means for selectively moving said carriage toward and away from a section of said framework so as to form an adjustable beam component-receiving passage therebetween, upper and lower pairs of beam-web rollers adjustably mounted upon said carriage and extending into said passage, corresponding upper and lower pairs of beam-web rollers adjustably mounted upon said framework section and also extending into said passage in opposed relationship to the upper and lower pairs of beam-web rollers on said carriage, means for moving the rollers in all of said pairs of beam-web rollers into engagement with a beam web to slidingly clamp and support the web of a beam therebetween, a plurality of beam-flange rollers on said carriage and extending into said passage, a plurality of beam-flange rollers mounted on said framework section and also extending into said passage in opposed relation to said first plurality of beam-flange rollers, said first and second plurality of beam-flange rollers acting to slidingly support and clamp therebetween opposed flanges of a beam which are arranged at an angle to the web of a beam, at least one welding head means mounted upon said framework and projecting into said passage, said welding head means also being disposed adjacent a point where a flange and the web of a beam contact each other while being clampingly supported with respect to each other, a rotatable back-up roll on said carriage and the fixed framework section for engaging the flanges of the beam and for holding the flanges and web of a beam together in the form of a clamped assembly of components and for driving said clamped assembly of components through said passage and past said welding head means and drive means for rotating said back-up rolls.

12. A device for fabricating beams as set forth in claim 11 including a master circuit means for said welding head means, means disposed in said circuit means and operable upon the de-energization of said master circuit means for automatically de-energizing the drive means for said back-up rolls.

13. A device as set forth in claim 11 wherein said roller moving means includes link and lever means for simultaneously adjusting all of said beam-web rollers.

14. A device as set forth in claim 11 wherein the means for selectively moving the carriage and the back-up roll mounted thereon into holding engagement with a beam flange includes a piston and cylinder assembly, fluid circuit means for motivating the piston within the cylinder of the piston and cylinder assembly, a pressure control valve in said fluid circuit means for motivating the piston within the cylinder of the piston and cylinder assembly, and a pressure relief valve means in said fluid circuit means for maintaining a constant predetermined pressure on the said piston, the back-up roll mounted on the carriage and the clamped assembly of components irrespective of the width of the web of the beam being fabricated.

15. A device as set forth in claim 14 including a master circuit means for said welding head means, means disposed in said circuit means and operable upon the de-energization of said master circuit means for automatically de-energizing the drive means for said back-up rolls.

16. Apparatus for welding beams comprising the combination of a framework, a carriage slidably mounted on said framework, a plurality of rollers mounted on a fixed portion of said framework, a second plurality of rollers mounted on said carriage, means for moving said first and second plurality of rollers into supporting and sliding engagement with opposed sides of a first beam component, separately mounted support means on said carriage for slidably supporting a second beam component at a predetermined angle and in fixed position with respect to said first beam component, a welding head means mounted on said framework and disposed adjacent the point where said components contact each other while being supported in a fixed position with respect to each other, a back-up roll mounted on the fixed portion of the framework and a back-up roll mounted on the carriage in opposing relationship to said first-mentioned back-up roll, said back-up roll on the carriage being adapted to engage the second beam component and to press the second beam component into clamping contact with the first beam component, means for driving all of said back-up rolls and in turn said beam components past said welding head means and means for selectively moving said carriage and the back-up roll mounted thereon into holding engagement with said second beam component and for maintaining said holding engagement during the driving of said back-up rolls so as to maintain all of said components in a fully clamped condition as the clamped components are driven past said welding head means by said back-up rolls.

17. Apparatus as set forth in claim 16 wherein said roller moving means includes electro-mechanical means for simultaneously moving said first and second plurality of rollers into sliding engagement with opposed sides of the first beam component.

18. Apparatus as set forth in claim 16 wherein the means for selectively moving the carriage and the back-up roll mounted thereon into holding engagement with the second beam component includes a piston and cylinder assembly and fluid circuit means for motivating the piston within the cylinder of the piston and cylinder assembly, whereby said back-up roll mounted on the carriage will maintain all of the beam components in a clamped condition irrespective of the width of the first beam component during passage of the beam components past the welding head means.

19. A device as set forth in claim 16 including a master circuit means for said welding head means, means disposed in said circuit means and operable upon the de-energization of said master circuit means for automatically deenergizing the drive means for said back-up rolls.

References Cited in the file of this patent
UNITED STATES PATENTS

| | | |
|---|---|---|
| 1,831,343 | Caldwell | Nov. 10, 1931 |
| 2,381,742 | Guirl | Aug. 7, 1945 |